(12) United States Patent
Schmelz

(10) Patent No.: US 11,805,738 B2
(45) Date of Patent: Nov. 7, 2023

(54) SOD ROLLER TERMINAL ATTACHMENT FOR EXCAVATOR

(71) Applicant: Paul E. Schmelz, High Springs, FL (US)

(72) Inventor: Paul E. Schmelz, High Springs, FL (US)

(*) Notice: Subject to any disclaimer, the term of this patent is extended or adjusted under 35 U.S.C. 154(b) by 273 days.

(21) Appl. No.: 16/857,370

(22) Filed: Apr. 24, 2020

(65) Prior Publication Data

US 2021/0329854 A1 Oct. 28, 2021

(51) Int. Cl.
*A01G 20/18* (2018.01)
*E02F 3/96* (2006.01)

(52) U.S. Cl.
CPC .............. *A01G 20/18* (2018.02); *E02F 3/963* (2013.01)

(58) Field of Classification Search
CPC ......... A01G 20/18; E02F 3/963; E02F 3/3604
See application file for complete search history.

(56) References Cited

U.S. PATENT DOCUMENTS

| | | | | |
|---|---|---|---|---|
| 2,815,137 A | * | 12/1957 | Johnson | E02F 3/384 414/715 |
| 3,396,946 A | | 8/1968 | Maddock | |
| 4,084,763 A | * | 4/1978 | Zamboni | A01G 20/18 242/399.1 |
| 4,581,833 A | | 4/1986 | Zeravica | |
| 4,648,769 A | * | 3/1987 | Stirling | B66F 9/145 414/800 |
| 4,886,409 A | * | 12/1989 | Penner | A01D 87/127 242/564.4 |
| 4,948,328 A | | 8/1990 | Busch | |
| 5,026,238 A | * | 6/1991 | Walt | A01D 87/127 414/800 |
| 5,125,788 A | | 6/1992 | Stenger | |
| 5,350,250 A | | 9/1994 | Nagler | |
| 5,437,528 A | * | 8/1995 | Decker | A01G 20/15 414/908 |
| 5,621,987 A | | 4/1997 | Pratt et al. | |
| 5,628,130 A | | 5/1997 | Desrochers | |
| 5,688,009 A | * | 11/1997 | Pienta | B21C 47/006 414/911 |

(Continued)

FOREIGN PATENT DOCUMENTS

| | | |
|---|---|---|
| JP | S6043534 | 3/1985 |
| KR | 10-1998-073436 | 11/1998 |

(Continued)

OTHER PUBLICATIONS

Amulet, "XBoom Coupler" Jun. 29, 2017, retrieved from: https://web.archive.org/web/20170629083220/http://www.amulet.com/products/xboom-coupler/, pp. 1-4.

(Continued)

*Primary Examiner* — Jamie L McGowan
(74) *Attorney, Agent, or Firm* — SALIWANCHIK, LLOYD & EISENSCHENK

(57) ABSTRACT

A terminal attachment for use with an excavator jointed arm. The terminal attachment supports a sod roll on a shaft connected to the end of an excavator jointed arm. Embodiments allow the sod roll to be unrolled by moving the jointed arm or by moving the excavator. The terminal attachment allows sod rolls to be unrolled on an incline.

22 Claims, 6 Drawing Sheets

(56) References Cited

U.S. PATENT DOCUMENTS

| | | | | |
|---|---|---|---|---|
| 5,697,452 | A * | 12/1997 | Link | A01G 20/18 172/19 |
| 5,850,704 | A | 12/1998 | Harinen | |
| 5,927,665 | A | 7/1999 | Grabnic | |
| 5,988,289 | A * | 11/1999 | Holland | A01G 20/18 414/920 |
| 6,131,668 | A * | 10/2000 | Houska | A01G 20/12 172/253 |
| 6,299,094 | B1 | 10/2001 | James, Jr. | |
| 6,318,952 | B1 * | 11/2001 | Waggoner | B66C 1/24 37/906 |
| 6,533,529 | B2 | 3/2003 | Waggoner | |
| 6,550,406 | B2 * | 4/2003 | Bass | A01G 20/18 172/19 |
| 7,350,738 | B1 * | 4/2008 | Himmelberg | A01G 20/18 242/422.5 |
| 7,464,894 | B1 * | 12/2008 | Himmelberg | A01G 20/18 242/422.5 |
| 7,494,314 | B2 | 2/2009 | Bares et al. | |
| 7,735,249 | B2 | 6/2010 | Muller | |
| 8,079,162 | B1 | 12/2011 | Sherman | |
| 8,308,413 | B2 * | 11/2012 | Ford | A01G 20/18 242/596.7 |
| 8,528,239 | B2 | 9/2013 | Andrina | |
| 8,763,226 | B1 | 7/2014 | Gustafson | |
| 9,945,093 | B1 | 4/2018 | Belliveau | |
| 10,117,386 | B1 * | 11/2018 | Wilson | A01G 20/12 |
| 10,464,790 | B1 * | 11/2019 | Brutaru | G02B 6/54 |
| 2002/0144825 | A1 * | 10/2002 | Bass | A01G 20/18 172/19 |
| 2005/0167540 | A1 * | 8/2005 | Keeven | B65H 16/06 242/557 |
| 2008/0193228 | A1 * | 8/2008 | Ruiz | A01B 45/00 405/302.6 |
| 2010/0314482 | A1 * | 12/2010 | Merkt | A01G 20/18 242/557 |
| 2011/0073701 | A1 * | 3/2011 | Ford | A01G 20/18 242/590 |
| 2011/0088291 | A1 * | 4/2011 | Fluharty | E02F 3/10 37/411 |
| 2012/0067996 | A1 * | 3/2012 | Motz | B65H 18/10 242/416 |
| 2012/0246978 | A1 | 10/2012 | Haley et al. | |
| 2016/0356338 | A1 | 12/2016 | Beckhusen et al. | |
| 2018/0038062 | A1 | 2/2018 | Weaver | |
| 2018/0038165 | A1 | 2/2018 | Park | |
| 2018/0135272 | A1 | 5/2018 | Gonzalez | |

FOREIGN PATENT DOCUMENTS

| | | |
|---|---|---|
| KR | 10-2015-0045195 | 4/2015 |
| KR | 101540422 | 7/2015 |
| KR | 101695438 | 1/2017 |
| WO | WO 2013/187851 | 12/2013 |

OTHER PUBLICATIONS

Brandt, "Lug Adapter: Excavator Attachment" Sep. 3, 2016, retrieved from: https://web.archive.org/web/20160903064719/http://www.brandt.ca:80/Divisions/Equipment-Solutions/Products/Excavator-Attachments/Lug-Adapter, pp. 1-3.

Craig, "EXM-CWL Convertible Wedge Lock Coupler" Dec. 5, 2018, retrieved from: https://web.archive.org/web/20181205195929/https://www.craigattachments.com/products/excavator/couplers/convertiblewedge-lock-coupler/, pp. 1-2.

Craig, "EXM-ISH Craig S-Style Coupler (SI, S2, S3)" Dec. 5, 2018, retrieved from: https://web.archive.org/web/20181205200116/https://www.craigattachments.com/products/excavator/couplers/craig-s-stylecoupler/, pp. 1-2.

Craig, "EXM-CQL2 Craig Quik Loc Gen. 2" Dec. 5, 2018, retrieved from: https://web.archive.org/web/20181205200207/https://www.craigattachments.com/products/excavator/couplers/craig-quik-loc/, pp. 1-2.

Written Opinion in International Application No. PCT/US2021/070434, dated Aug. 10, 2021, pp. 1-8.

\* cited by examiner

SOD ROLLER TERMINAL ATTACHMENT FOR EXCAVATOR

BACKGROUND OF INVENTION

Turf grass or sod is often placed on inclined surfaces along roadways, drainage ditches, retention ponds, and other areas to reduce erosion. Along inclined surfaces of waterways, the sod is usually laid down to the water line. Sod comes in rolls that are laid in long strips or shorter sections that are stacked and laid by hand. Sod provided in large rolls, weighing several hundred pounds, usually have a tube in the center (6" PVC is common) on which the roll is wound during harvest. A skid steer, tractor, or similar front load device having two arms are used to support each end of the tube between them, to unwind the sod. The sod roll can be raised and lowered above level ground with these types of equipment, but cannot be laid on steep incline with this type of equipment. Hand-rolling of smaller sod rolls, placement of smaller sections, or other more laborious, time-intensive techniques must be used to place sod on inclined surfaces.

Hydraulic excavators have a jointed arm comprising a boom and a "stick" that allows a greater range of motion than most other construction-related equipment. The boom attaches to a cab for the driver and the stick is attached to the end of the main boom. One hydraulic piston is configured parallel to the boom to raise and lower the stick. A second hydraulic piston is configured parallel to the stick and controls the tilt of a terminal attachment, relative to the stick. Terminal attachments, such as buckets, scoops, rakes, and the like, are attached to the end of the excavator jointed arm to create a "working end" on the excavator arm. The terminal attachment is typically "pinned" to the stick and the second hydraulic piston by couplers, so that together they form a two-point connection to the terminal attachment. Terminal attachments swing or rotate in-line with the jointed arm at the first point and the second hydraulic piston attached at the second point is used to control the motion or swing of the terminal attachment. This allows the terminal attachment to be tilted relative to the stick. The jointed arm advantageously allows the terminal attachment to be operated below the level of the cab or below the surface on which the cab is operated.

It would be advantageous to utilize the range of motion provided by an excavator jointed arm to lay sod rolls on an incline. There is a need for a terminal attachment that can support large sod rolls on the working end and be manipulated by the excavator and jointed arm to lay the sod roll on an inclined surface.

BRIEF SUMMARY

The subject invention addresses the above described disadvantages associated with the previously known devices and methods for laying sod on inclined surfaces, and provides certain attributes and advantages, which have not been realized by these known devices and methods. In particular, the subject invention provides a novel and highly effective terminal attachment for an excavator jointed arm and methods of using the terminal attachment for rolling sod on a surface, particularly an inclined surface, utilizing an excavator.

Embodiments of the subject invention pertain to a sod roller terminal attachment that can be affixed to the end of an excavator arm or other equipment that can be used to unroll sod. The sod roller terminal attachment can be manipulated by the excavator arm, which has a jointed boom and "stick" capable of supporting a sod roll. The boom can also be used to unroll or lay a sod roll in areas that cannot be reached by other types of equipment. The sod roller terminal attachment of the subject invention advantageously allows the jointed arm of an excavator to be used to manipulate a shaft to unroll sod on a level or inclined surface, by moving the jointed arm. On inclined surfaces, the cab of the excavator can remain safely on the edge of the incline and the jointed arm and stick can be used to move the boom and unroll the sod roll as the excavator arm is moved towards or away from the cab or up and down an incline. Alternative embodiments allow the boom to be positioned with a sod roll thereon against a surface and the entire excavator to be moved thereby unrolling the sod as the excavator moves.

The sod roller terminal attachment can make a two-point connection with the stick that advantageously allows the sod roll to be tilted at the same angle as the incline or other surface. This also allows the boom to apply pressure against the sod as it is unrolled to press or seat the sod into the soil of the incline or other surface. The subject invention allows large sod rolls to be used to cover surfaces, and is particularly advantageous in covering inclined surfaces, such as those in ditches, drain culverts, retention ponds, and other inclined surfaces much quicker and with minimal labor.

It should be noted that this Brief Summary is provided to generally introduce the reader to one or more select concepts described below in the Detailed Disclosure in a simplified form. This Summary is not intended to identify key and/or required features of the claimed subject matter. Other aspects and further scope of applicability of the present invention will also become apparent from the detailed descriptions given herein. It should be understood, however, that the detailed descriptions, while indicating certain embodiments of the invention, are given by way of illustration only, since various changes and modifications within the spirit and scope of the invention will become apparent from such descriptions. The invention is defined by the claims below.

BRIEF DESCRIPTION OF DRAWINGS

In order that a more precise understanding of the invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which.

DETAILED DISCLOSURE

Figure 1:
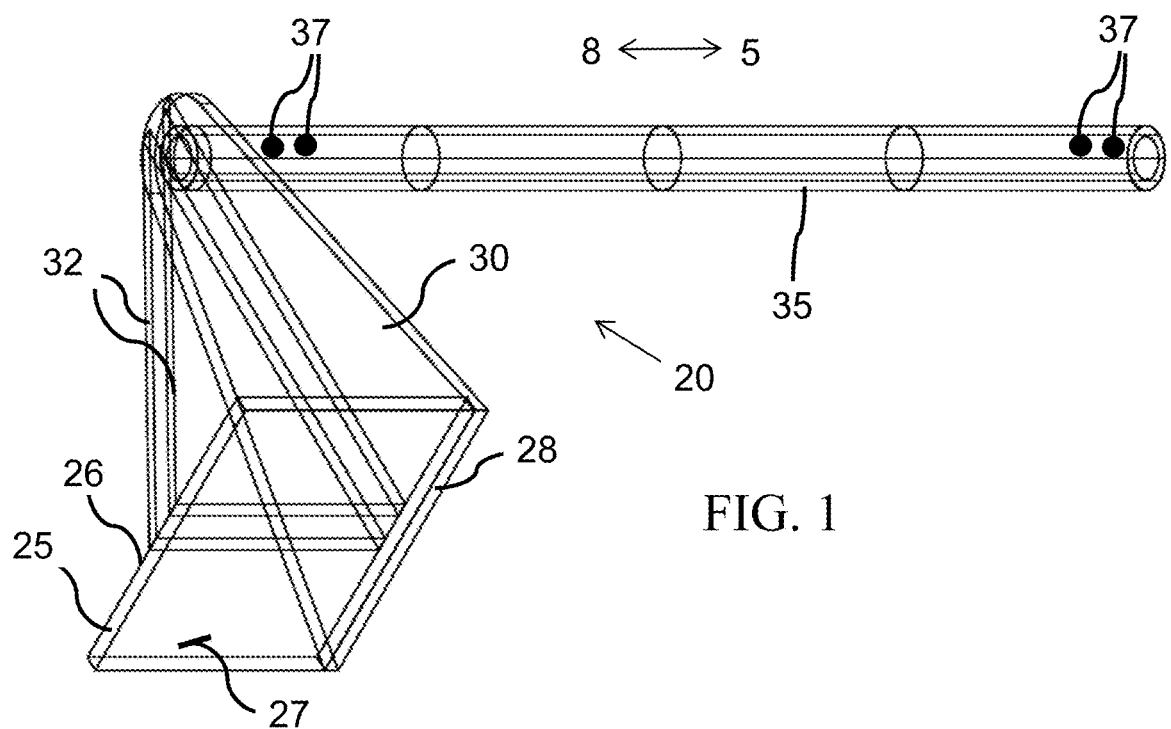
FIG. 1 shows an embodiment of a sod roller terminal attachment, according to the subject invention.

The subject invention provides embodiments of a terminal attachment that can be attached to the jointed arm of an excavator. More specifically, the subject invention provides one or more advantageous embodiments of a sod roller terminal attachment that allows the excavator jointed arm to be used to unroll sod on a level or inclined surface, by moving the jointed arm or the entire excavator. The following description will disclose that the subject invention is particularly useful for manipulating sod rolls and unrolling the sod on an inclined surface. Embodiments of the subject invention could also be useful for manipulating and placing pipe, or other devices or materials that can be supported and manipulated with the sod roller terminal attachment of the subject invention. The sod roller terminal attachment can also be used on equipment other than an excavator. A person with skill in the art will be able to recognize numerous other uses that would be applicable to the devices and methods of the subject invention. Such variations in use and modifications to facilitate such alternative use that provide the same functionality, in substantially the way as described herein, with substantially the same desired results, are within the scope of this invention.

In the description that follows, a number of terms are utilized. In order to provide a clear and consistent understanding of the specification and claims, including the scope to be given such terms, the following definitions are provided.

The terms "about" or "approximately," as used herein, are defined as at least close to a given value or either end of a range as is necessary to cover manufacturing variances, equipment tolerances, and normal variances in material, as understood by those skilled in the art.

Also, as used herein, and unless otherwise specifically stated, the terms "operable communication," "operable connection," "operably attached," "cooperatively engaged" and grammatical variations thereof mean that the particular elements are connected in such a way that they cooperate to achieve their intended function or functions. The "connection" or "engagement" may be direct, or indirect, physical or remote.

In addition, reference is made throughout the application to the "proximal end" and "distal end." As used herein, the proximal end is that end that approaches or is nearest to an excavator arm. For example, the proximal end of the angle arm can be operably attached to the front face of the connector plate. Conversely, the distal end is that end furthest from the excavator arm. For example, a flange cap for securing the sod roll on the shaft can be located at the distal end of the shaft.

It is to be understood that the figures and descriptions of embodiments of the present invention have been simplified to illustrate elements that are relevant for a clear understanding of the invention, while eliminating, for purposes of clarity, other elements that may be well known. Those of ordinary skill in the art will recognize that other elements may be desirable and/or required in order to implement the present invention. However, because such elements are well known in the art, and because they do not facilitate a better understanding of the present invention, a discussion of such elements is not provided herein.

The present invention is more particularly described in the following description that is intended to be illustrative only because numerous modifications and variations therein will be apparent to those skilled in the art. As used in the specification and in the claims, the singular for "a," "an" and "the" include plural referents unless the context clearly dictates otherwise.

Reference will be made to the attached Figures on which the same reference numerals are used throughout to indicate the same or similar components. With reference to the attached Figures, which show certain embodiments of a the subject invention, it can be seen in FIG. 1 that a sod roller terminal attachment 20 can have a connector plate 25 that can be used to attach the sod roller terminal attachment to a piece of equipment, such as the stick 14 of an excavator arm, seen in FIG. 9. Attached to the connector plate can be an angle arm 30. A shaft 25 can extend from the connector plate or the angle arm. A flange cap 40, such as shown in the example in FIG. 13, can also be arranged on the distal end 5 of a shaft to inhibit a sod roll from sliding off the shaft and on a proximal end 8 to maintain a distance between a sod roll and the other components of the sod roll terminal attachments. Each of these general components can have one or more sub-components, which will be discussed in detail below.

Figures 11, 12:
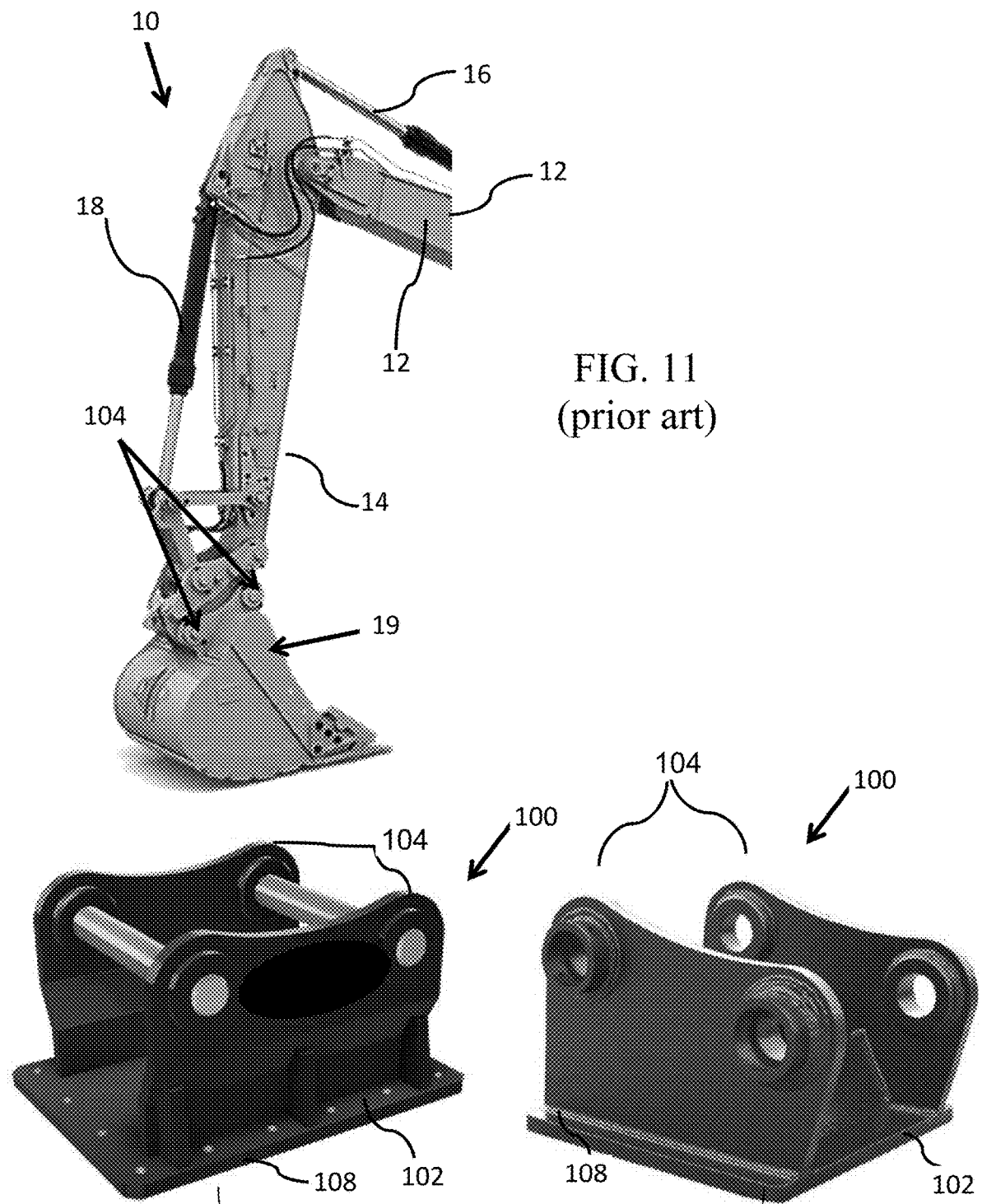
FIG. 11 (prior art) shows an example of an excavator arm which can be used with embodiments of a sod roller terminal attachment of the subject invention.
FIG. 12 (prior art) shows examples of pin-on connectors that can be used with embodiments of a sod roller terminal attachment of the subject invention.

Hydraulic excavators have a jointed arm 10, like that shown in FIG. 11, which allows a greater range of motion than most other heavy construction equipment. The excavator jointed arm has a main boom 12 that attaches to a cab (not shown) and a "stick" 14 attached to the end of the main boom. The boom raises and lowers the stick. A first hydraulic piston 16 is configured along or next to the main boom and attaches to raise and lower the stick, relative to the boom. A second hydraulic piston 18 is configured along or next to the stick 14 and controls the tilt or swing of a terminal attachment 19, relative to the stick 14. The stick has a coupler at the distal end 5 that connects to pin-connectors 104 on a terminal attachment to form a two-point connection between the stick and the second hydraulic piston. Pin connectors can vary between different types, brands, and sizes of terminal attachments, but most are designed to be "pinned" to the coupler on an excavator stick. When pinned to the stick, movement of the terminal attachment is controlled by the second hydraulic piston, which tilts or rotates the terminal attachment relative to the stick.

While there are numerous commercially available terminal attachments that can be used to make a two-point connection with a stick, some non-standard or non-commercial terminal attachments may not be configured with a pin-on connector. To facilitate the attachment of these terminal attachments 19 to a stick, a pin-on connector 100, such as those shown for example in FIG. 12, can be used to create a two-point connection for a terminal attachment. A pin-on connector has a platform 102 with pin-connectors 104 on a top side and an opposite side surface 108 to which the terminal attachment 19 can be affixed by welding, bolting, or by other techniques, or some combination thereof.

In one embodiment, a sod roller terminal attachment 20, of the subject invention, can be configured for connection to the coupler 15 on a stick. To facilitate attachment to the stick, a sod roller terminal attachment can have a connector plate 25 with a front side 26 and a back side 27, such as shown, for example, in FIGS. 1 and 2. A connector plate can have various dimensions depending on the coupler 15 it will be used with, how it will be attached to the coupler, the type of material use for the connector plate, and other factors known to those with skill in the art.

In one embodiment, a connector plate is rectangular in shape with dimensions between about 20"×about 16", between about 19"×about 15", between about 18"×about 14", between about 17"×about 13", between about 16"× about 12", and between about 15" and 11". In one embodiment, the back side 27 of a connector plate of a sod roll terminal attachment 20 has pin connectors 104 arranged thereon that are attachable to the coupler at the distal end 5 of a stick 14, as shown, for example, in FIG. 2. The pin connectors 104 on a sod roll terminal attachment can be similar to other pin connectors known in the art that can be connected to the coupler of a stick 14.

Alternatively, a pin-on connector 100, or similar device, can be used to facilitate a two-point connection. In one embodiment, the platform 108 of a pin-on connector 100 is attached to the back side 27 of the connector plate 25 on a sod roller terminal attachment. For example, a pin-on connector, such as those shown in FIG. 12, can be welded or bolted to the connector plate 25 or, alternatively, the platform 102 can be used as a connector plate 25. While this is not shown in the Figures, it would be readily understood by a person of skill in the art.

Figure 3A:
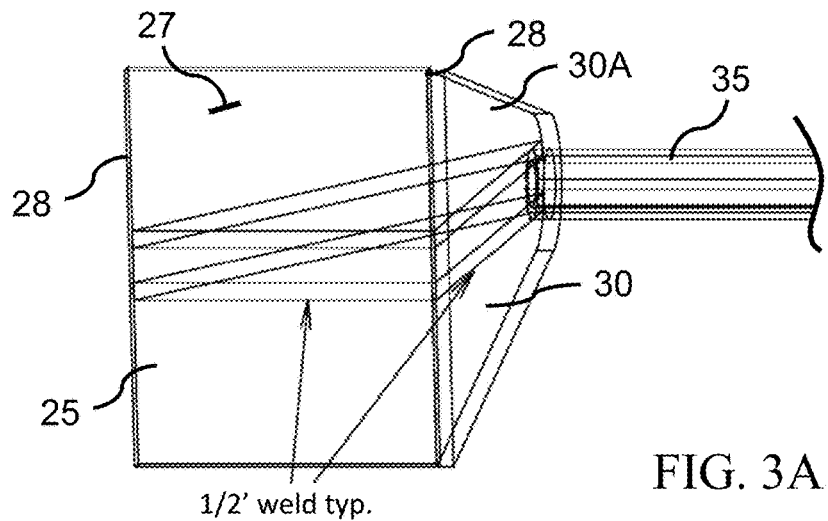
FIG. 3A shows an embodiment of a sod roller terminal attachment, according to the subject invention, with the shaft configured approximately perpendicular to the angle arm or the connector plate.
Figure 3B:
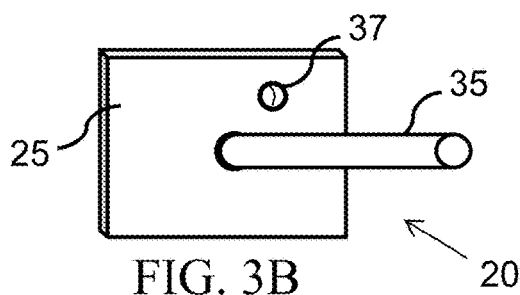
FIG. 3B shows an embodiment of a sod roller terminal attachment, according to the subject invention, with the shaft configured approximately perpendicular to a connector plate, such that the shaft will be approximately parallel or collinear with an excavator arm pinned thereto.
Figure 3C:
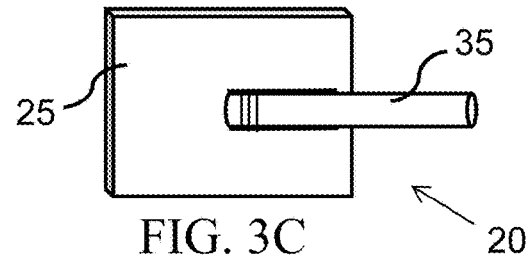
FIG. 3C shows an embodiment of a sod roller terminal attachment, according to the subject invention, with the shaft operatively attached to a connector plate so as to be approximately perpendicular to an excavator arm pinned thereto.

When sod is harvested, it is cut into long, strips that are rolled up. Sod rolls can vary in diameter and length, but large sod rolls are typically about 2' in diameter×6' in length. It can be seen in FIG. 10 that a sod roll has a pipe 9 or other similar tubular structure at the center on which the sod is rolled during harvest. The pipe can extend slightly out, a few inches, from each side of the sod roll. This same pipe can be used to support and unroll the sod roll. In one embodiment, a sod roller terminal attachment 20 has a shaft 35 that can be inserted into the pipe so the sod roll can be supported by the excavator jointed arm. In one embodiment, the shaft is operably connected to a connector plate 25, as shown in FIGS. 3B and 3C.

Figure 2:
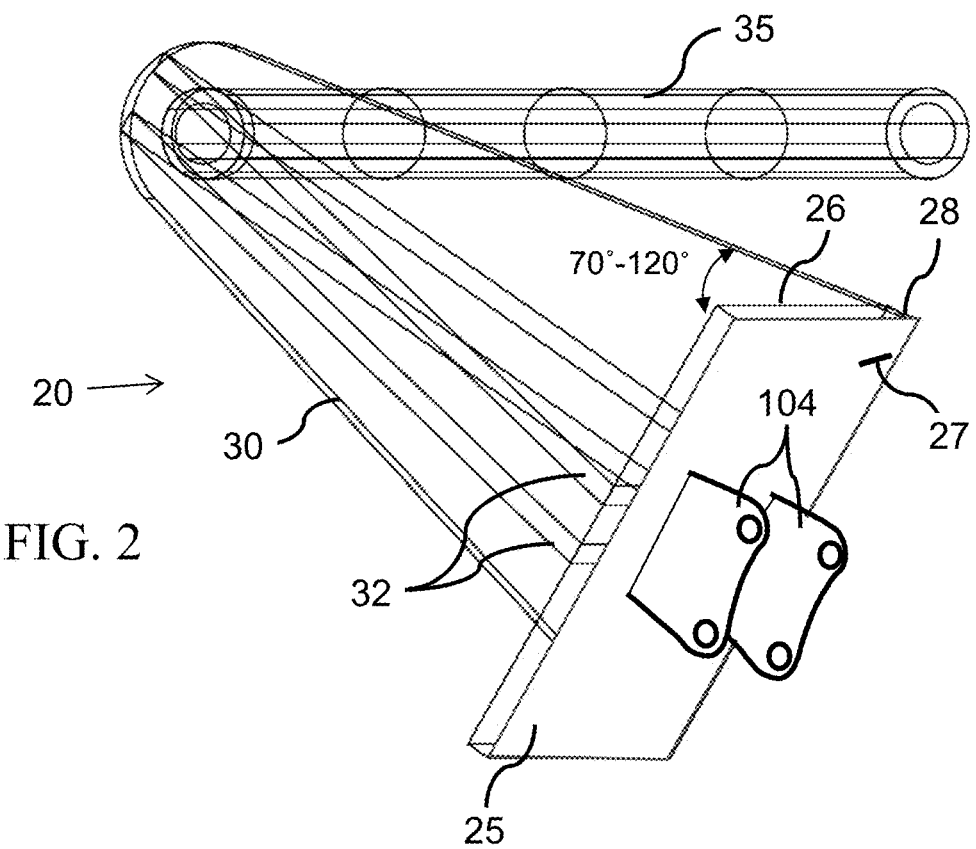
FIG. 2 shows an embodiment of a sod roller terminal attachment, according to the subject invention, with pin-connectors.

It can be preferable, however, for the shaft 35 to be at a distance from the connector plate so that the side of a sod roll thereon is also distanced from the coupler 15 of the excavator arm 10. In one embodiment, the shaft is fixedly attached to an angle arm 30 that extends from the front side 26 of the connector plate. One example of an angle arm can be seen in FIG. 5. In a further embodiment, an angle arm is at or near a side edge 28 of a connector plate, such that one side 30A of the angle arm is at or near the side edge and a second side 30B of the angle arm faces the connector plate, examples of which are shown in FIGS. 1, 2, and 3. In an alternative embodiment, an angle arm is at or near the center 29 of a connector plate, which is shown, for example, in FIG. 4. With this embodiment, the one side 30A of the angle arm faces over the side of the connector plate and the second side 30B of the angle arm faces over an opposite side of the connector plate. An angle arm can extend from the front side 26 of a connector plate 25 at an angle of between about 70° to about 120°, as indicated in FIG. 2. In a specific embodiment, an angle arm extends from the front face of a connector plate at about 90° or approximately perpendicular to the connector plate 25, as shown, for example, in FIG. 3A.

Figure 4:
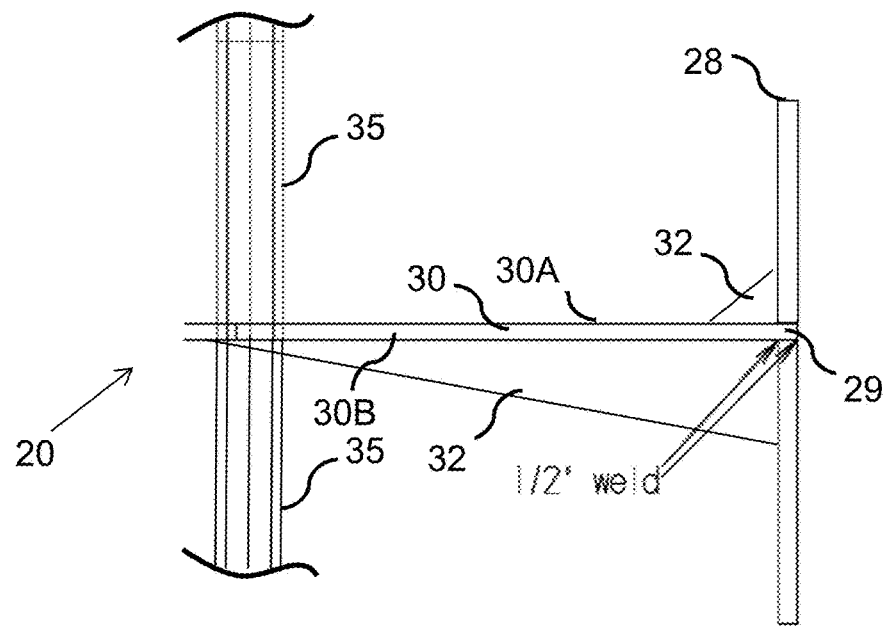
FIG. 4 shows an embodiment of a sod roller terminal attachment, according to the subject invention, with the angle arm operatively connected at about a center of the connector plate, a shaft extending to either side of the angle arm and supports on either side of the angle arm.
Figure 8:
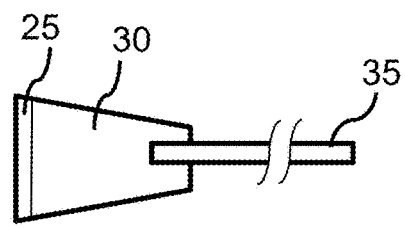
FIG. 8 shows an embodiment of a sod roller terminal attachment, according to the subject invention, where the shaft is attached to the angle arm so as to be parallel or collinear with the angle arm and an excavator arm pinned thereto.
Figure 6:
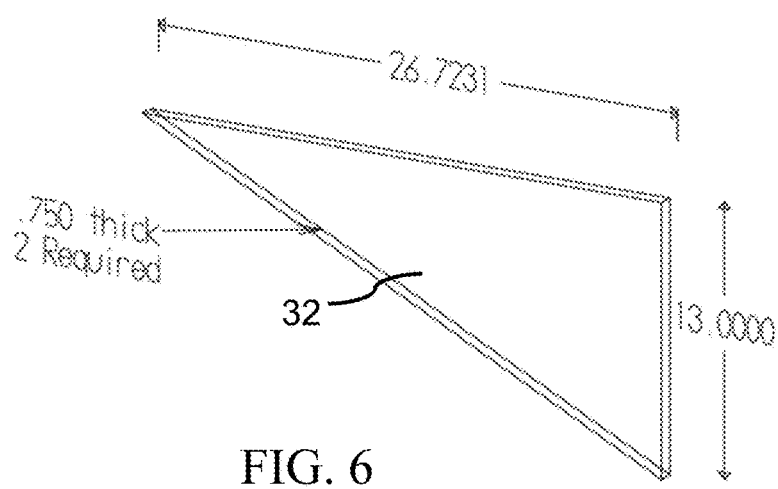
FIG. 6 shows an embodiment of a support, according to the subject invention. In this embodiment, the support is a gusset that can be connected between an angle arm and a connector plate.

To lend additional strength to the angle arm, one or more supports 32 can be employed between the angle arm and the connector plate. Supports can buttress the angle arm and inhibit torquing, breaking, bending or other deformations of the angle arm and/or the connector plate. Supports can include, but are not limited to, gussets, brackets, props, and other devices that can maintain the position of the angle arm on the connector plate. Supports can be attached to the angle arm and the connector plate by various techniques and/or devices, including, but not limited to, welding, bolting, a mortis and tenon configuration, bore hole configuration, adhesives, pins, hooks, by other techniques known in the art and combinations thereof. In one embodiment, at least one gusset is welded to the angle arm 30 and the front side 26 of the connector plate. In one embodiment, a support, such as a gusset, can extend from the front side of the connector plate to the distal end 5 of the angle arm. In a further embodiment, a support, such as a gusset, can extend towards the distal end of the angle arm by at least 10%, 15%, 20%, 25%, 30%, 35%, 40%, 45%, 50%, 55%, 60%, 65%, 70%, 75%, 80%, 85%, 90%, 95%, and/or 100%, of the length (L) of the angle arm 30. In a further embodiment, the length (L) of an angle arm is in a range of between about 14" and about 40", a range of between about 14" and about 35", and a range of about 14" and about 30.' In a specific embodiment, the length of an angle arm is about 28". FIG. 6 illustrates one example of a support that can be used between an angle arm and a connector plate. FIGS. 1, 2, and 8 illustrate a particular embodiment of a sod roller terminal attachment having two gussets arranged between the front side 26 of a connector plate 25 and an angle arm 30 to lend strengthen and support to the angle arm. As mentioned above, an angle arm can be located at a side edge or at or near the center 29 of a connector plate. This can allow one or more supports to be attached to one or both sides of the angle arm 30. In one embodiment, the supports utilized on one or both sides of an angle arm are different or have different dimensions, an example of which is shown in FIG. 4.

Sod rolls can vary in diameter and length and typically have a pipe 9 or other similar tubular structure at the center that is used during harvest to roll the sod, as described above. This same pipe can be used when unrolling the sod with embodiments of a sod roller terminal attachment 20 of the subject invention. In one embodiment, a shaft 35 holds a sod roll on the sod roller terminal attachment 20 by cooperatively engaging with the pipe. In one embodiment, a shaft is an elongated, rigid pipe, rod, pole, tube, dowel, or the like, with sufficient tensile strength to support a sod roll. The peripheral shape of a shaft can be round, oval, square, rectangular, triangular, or any other polygonal shape that allows the pipe in the sod roll to turn on the shaft. The diameter of the shaft can be less than the diameter of the pipe. In one embodiment, the diameter of a shaft is between about 1" and about 5", between about 1.5" and about 4.5", between about 2" and about 4", between about 2.5" and about 3.5", about 3", or a diameter between any two of the listed values. The length of a shaft can depend upon the size of the sod rolls to be supported. A shaft can, but does not have to, extend entirely through a sod roll pipe 9. In one embodiment, a shaft has a length from the distal end 5 to the proximal end 8 of at least 2', 2.5', 3', 3.5', 4', 4.5', 5', 5.5', 6', 6.5', and 7', or a length in a range between any two of the listed values.

Figure 9:
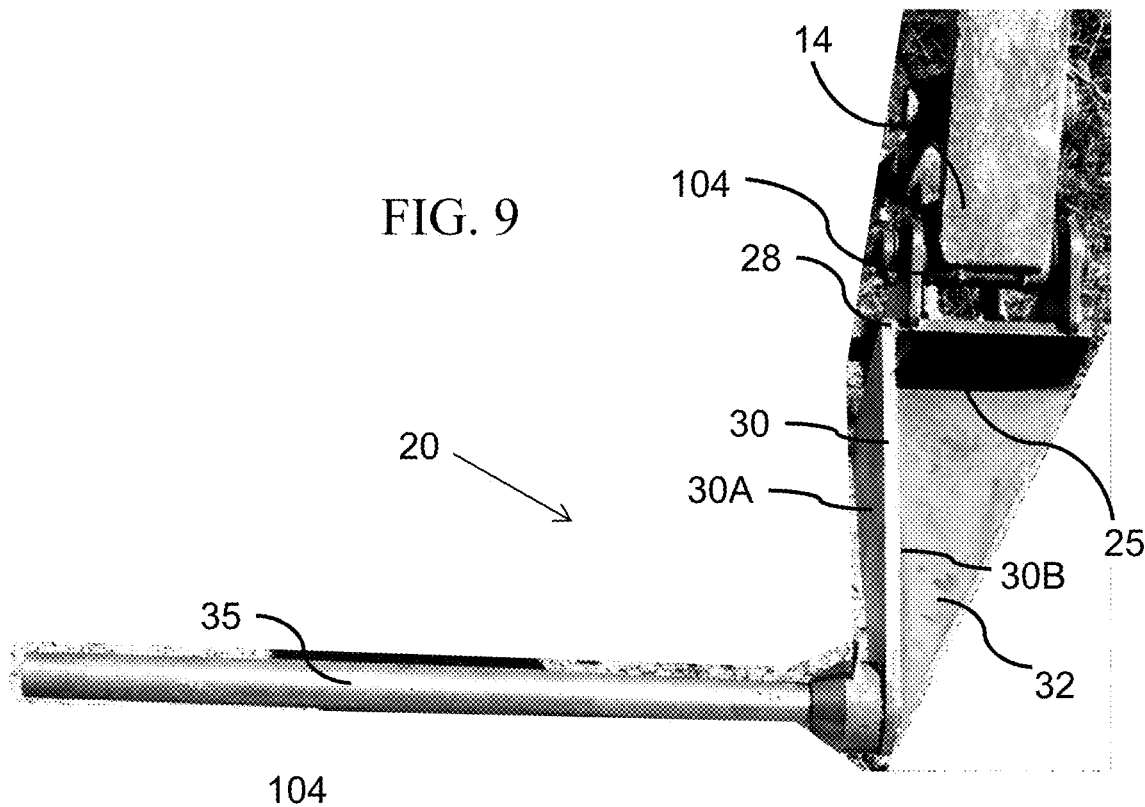
FIG. 9 shows an embodiment of a sod roller terminal attachment, according to the subject invention, pinned to an excavator arm.

A shaft 35 can extend from either side of an angle arm 30. In one embodiment, the shaft extends approximately perpendicular to the angle arm 30 and the excavator jointed arm, as demonstrated in FIGS. 1, 3A and 9. FIGS. 1, 2, and 9 illustrate an embodiment with an angle arm attached to a side edge 28 of a connector plate 25 and where the shaft extends opposite to the connector plate approximately perpendicular to the angle arm 30 and excavator jointed arm 10. Another embodiment, exampled in FIG. 4, shows an angle arm attached at or about the center of the connector plate. With this embodiment, a shaft can extend from either or both sides of the angle arm and be approximately parallel to the front side 26 of the connector plate and perpendicular to the excavator jointed arm. This can allow a sod roll to be supported on either or both sides of the sod roller terminal attachment. A shaft can also be attached at any point on an angle arm, but is preferably attached between a midpoint 31 and the distal end 5, more preferably at or near the distal end 5. Attachment of the shaft to the angle arm can be achieved by any of a number of devices and techniques, including, but not limited to, welding, bolting, a mortis and tenon configuration, bore hole configuration, adhesives, pins, hooks, combinations thereof, and by other techniques known in the art. In one embodiment, the angle arm has a through-hole 33, which can be seen in FIGS. 5, through which the shaft can be disposed and welded in place. In a further embodiment, the through-hole positions the end of the shaft between or adjacent to one or more supports 32 attached to the angle arm, which can lend additional support to the shaft, such as shown, for example, in FIGS. 2 and 3A.

Figure 10:
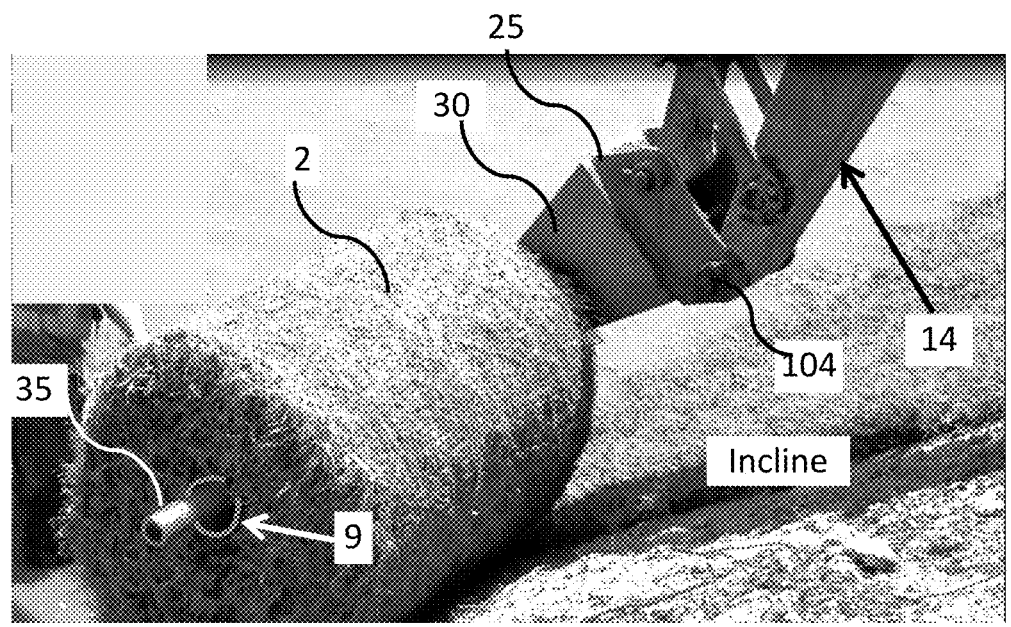
FIG. 10 shows an embodiment of a sod roller terminal attachment, according to the subject invention, in operation rolling a sod roll on inclined ground.

In an alternative embodiment, the shaft is operatively attached on the sod roller terminal attachment 20, so as to be approximately perpendicular to the connector plate, which would make it collinear or parallel with the excavator jointed arm. In one embodiment, the shaft 35 is operably attached or joined to the connector plate 25 so as to be approximately perpendicular to the connector plate and collinear or parallel to the jointed arm 10, an example of which is shown in FIG. 3B. Alternatively, the shaft can be operably attached or joined to an angle arm on the connector plate, by any of the methods and devices described above, so the shaft is collinear or parallel to the angle arm, which would also make it parallel or collinear with the jointed arm. FIG. 8 illustrates a non-limiting example of a shaft operably attached to an angle arm so that, when the sod roller terminal attachment 20 is pinned to the stick 14, the shaft is approximately collinear or parallel to the angle arm making it also approximately collinear or parallel to the jointed arm 10. With the shaft collinear or parallel to the jointed arm, the sod roller terminal attachment pinned on an excavator jointed arm can position a sod roll to the side and on an incline or other surface and as the excavator advances the sod can be unrolled. Again, this can be advantageous when rolling sod on an incline, where it may not be possible or feasible to roll sod up or down an incline, as shown in FIG. 10.

The ends of a sod roll, where the sod was cut, are usually uncovered and can be loose or frayed. It can be beneficial to protect the ends and minimize additional loosening or fraying of the sod. In one embodiment, a flange cap 40 is affixed to the proximal end 8 of the shaft 35 to distance the sod roll from the edges of an angle arm 30. A flange cap can be arranged around a shaft at or near the proximal end 8, so that it can be between the angle arm and an end of the sod roll. In embodiments where an angle arm is not utilized, a flange cap can be arranged on a shaft at or near the proximal end, so that it is between a connector plate 25 and an end of the sod roll.

Figure 13:
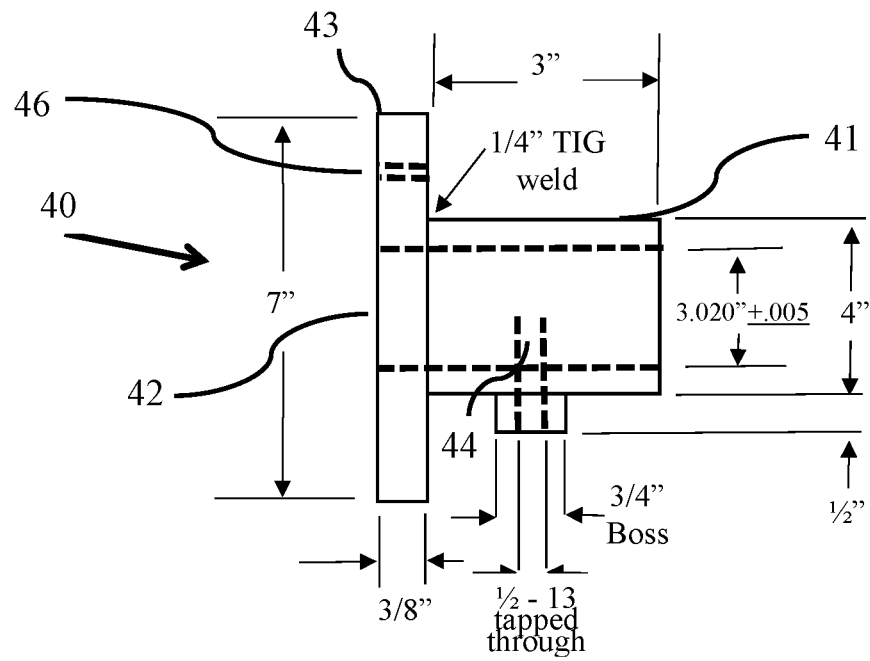
FIG. 13 shows an embodiment of a flange cap, according to the subject invention, that can be used on a shaft.

In one embodiment, a flange cap 40 has a tubular body 41 with a bore 42 that the shaft can fit in or slide through. FIG. 13 illustrates a non-limiting example of a flange cap. The dimensions of a flange cap can depend upon several factors, including, but not limited to the dimensions of the shaft, the angle arm, the connector plate. A person of skill in the art can determine the appropriate dimensions for flange cap. In one embodiment, the diameter of the bore in the flange cap is larger than the diameter of a shaft by about 0.1", 0.2", 0.3", 0.4", or 0.5" or 00.5", or is larger than the diameter of the bore by an amount in a range between any two of the listed values. In a very specific embodiment, where the shaft has a diameter of about 3", the bore 42 of the body 41 has a diameter of 3.020"±0.005". In a further very specific embodiment, the body has a diameter of about 4", with walls about 0.5" thick.

There can be a flange plate 43 that radiates out from the tubular body against which the pipe in a sod roll can press or abut against. A flange plate can provide a surface against which a sod roll can be abutted or pressed against. The flange plate can be used to distance the sod roll from the angle arm and/or the connector plate A flange plate can be a solid plate, can have one or more openings there through, can have spokes, can have one or more indentations, and can have any of a variety of other configurations that facilitate a sod roll being abutted against the flange plate. The flange plate can inhibit the edges of the angle arm and/or the connector plate from contacting the edge of the sod roll and fraying or loosening the sod edge. A flange plate can be attached anywhere along the length of the tubular body 41 and does not inhibit the shaft 35 from going through the flange cap 40. In other words, the flange plate radiates around the bore. In one embodiment the flange plate is attached to and radiates out from an end of the tubular body. Alternatively, the flange plate is attached to and radiates out at any point between the two ends of the tubular body. The diameter of a flange cap can also be larger than the diameter of a tubular body by about 1", 1.5", 2", 2.5", 3", 3.5", 4", 4.5", 5", 5.5", 6", 6.5", 7", 7.5", 8", 8.5", 9", 9.5", 10", 10.5", 11", 11.5" and 12", or a diameter that is larger than the diameter of the tubular body by an amount in a range between any two of the listed values. In a specific embodiment, the flange cap has a diameter of about 7".

Figure 14:
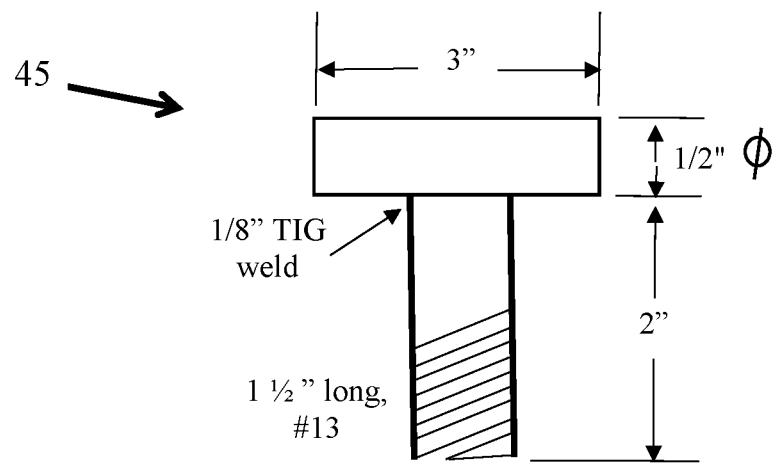
FIG. 14 shows an embodiment of a tightening screw, according to the subject invention, that can be used to secure a flange cap to a shaft.

A flange cap 40 can rotate freely on a shaft 35, turning or rotating as the sod roll turns or rotates on the shaft. Alternatively, a flange cap can be secured or affixed so as to inhibit turning or rotating with the sod roll. In one embodiment, the flange plate is secured to the shaft 35 with a tightening screw 45 that goes through a threaded hole 44 in the tubular body 41, which is shown, for example in FIG. 13. The tightening screw can exert force against the shaft to secure the flange plate. Tightening screws and their configuration are known to those with skill in the art. FIG. 14 illustrates an example of a tightening screw that can be used with the flange cap example in FIG. 13. In a further embodiment, the shaft 35 can have one or more screw receiving spaces 37 into which the tightening screw can be tightened. A screw receiving space can be one or more bore holes in the shaft, a channel around all or part of the periphery of the shaft, some combination thereof, or any other area on the shaft in which the tightening screw can be received to secure or fix the position of the flange cap. One non-limiting example of a flange cap with a tightening screw is shown in FIGS. 9, 13 and 14. When the sod roll is supported on the shaft, the pipe that extends out from the sod roll can go over the body 41 of the flange cap 40 and push against the flange plate 43. This can keep the end of the sod roll at a distance from the edges of the angle arm and/or connector plate and inhibit fraying or loosening of the sod roll as it turns.

Figure 5:
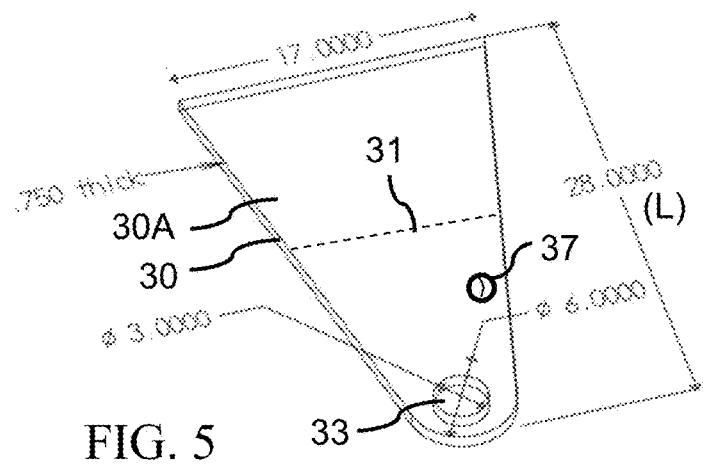
FIG. 5 shows an embodiment of an angle arm, according to the subject invention.

A flange cap can also be secured to the angle arm 30 and/or the connector plate 25 instead of, or in combination with, being secured to the shaft. In one embodiment, the flange plate has a bore hole 46 through which a tightening screw 45 can extend. The angle arm and/or the connector plate can have a screw receiving space 37 for the tightening screw, or similar structure, to fit. In one embodiment, the bore goes through the angle arm and/or the connector plate and the tightening screw goes through the bore to be secured with a bolt on the on the opposite side to hold the flange cap against the angle arm and/or the connector plate. FIG. 13 illustrates an example of a flange plate with a bore hole 46 therein. FIGS. 3B and 5 shown an example of a screw receiving space 37 in a connector plate 25 and an angle arm 30, respectively.

Figure 7:
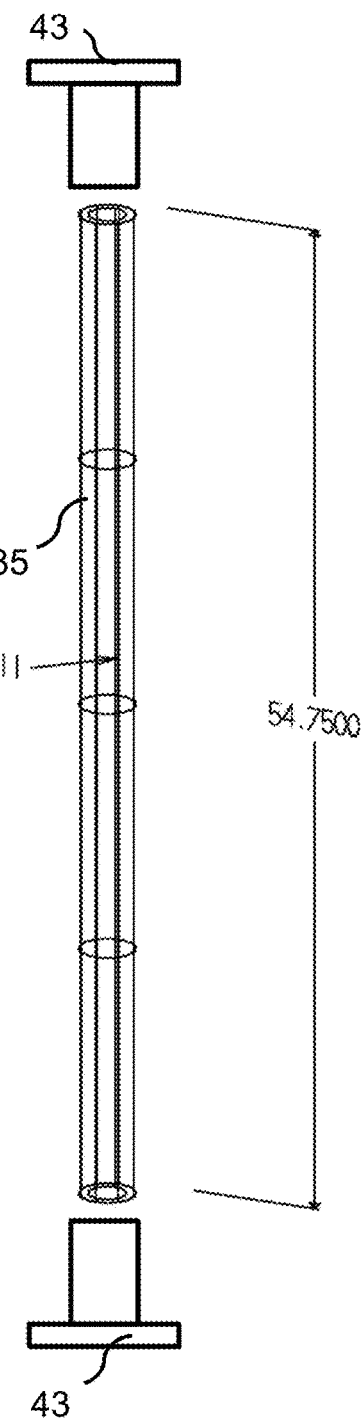
FIG. 7 shows an embodiment of a shaft, according to the subject invention. Also shown are flange caps at either end that can be arranged on the shaft.

A flange cap 40 can also be used to prevent a sod roll from sliding off the shaft. In one embodiment, a flange cap is attached at or about the distal end of the shaft in the same manner that it would be attached at or near the proximal end, as described above. The flange plate can inhibit the sod roll from sliding off the shaft. There can be one or more screw receiving spaces 37 at or near the distal end 5 of the shaft. In one embodiment, a flange cap can be arranged on both ends of the shaft and a sod roll secured there between. Thus, the flange caps can be used to position and secure a sod roll almost anywhere along the length of a shaft. For example, if a shaft is longer than a sod roll, a flange cap can be used on either side of the sod roll. FIG. 7 shows one example of how flange caps can be arranged to each end of a shaft.

The materials utilized for a sod roller terminal attachment 20 can vary depending on a variety of factors understood by those skilled in the art. Most terminal attachments used on excavators comprise at least some welded steel plate components. Embodiments of the subject invention can have components manufactured with ½" to ¾" steel plate joined by a ⅛" to ½" TIG weld or other appropriate weld. A person of skill in the art, having benefit of the subject disclosure, can determine any of a variety of materials and attachments that can be used to fabricate or manufacture a sod roller terminal attachment of the subject invention. Such variations that provide the same functionality, in substantially the way as described herein, with substantially the same desired results, are within the scope of this invention.

Embodiments of a sod roller terminal attachment 20 of the subject invention can be advantageously used with an excavator jointed arm. Where the sod roller terminal attachment has a shaft arranged perpendicular to the jointed arm, the sod can be unrolled on a surface by moving the jointed arm towards or away from the cab of the excavator. Alternatively, where the sod roller terminal attachment has a shaft arranged parallel or collinear with the jointed arm, the sod on the shaft can be placed against the surface, with the jointed arm towards the side, and unrolled by advancing the excavator while the jointed arm holds the sod against the surface. The ability to support and secure a sod roll on an excavator arm provides the unique advantage of using the excavator arm to unroll sod on an inclined surface.

Any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

The invention claimed is:

1. A method for unrolling a sod roll on a surface, the method comprising:
   obtaining an excavator with a single, extendable, jointed arm having attached thereto a sod roller terminal attachment that comprises:
   a connector plate with a front face and a back side, wherein the backside is configured for operable attachment to the excavator jointed arm,
   an angle arm fixedly attached to the front face of the connector plate and comprising a one side and a second side, and
   a shaft comprising a proximal end fixedly attached to the angle arm;
   inserting the shaft into the sod roll, so as to support the sod roll on the shaft with the jointed arm;
   positioning the sod roll, utilizing the jointed arm, on or near the surface on which the sod roll is to be unrolled; and
   moving the jointed arm, with the sod roll supported thereon, while the excavator remains stationary, so as to unroll the sod roll on the surface.

2. The method according to claim 1, wherein the surface is inclined, so as to be below a surface on which the excavator operates, and the jointed arm is moved to unroll the sod roll up or down the inclined surface.

3. The method according to claim 1, wherein there is at least one pin connector on the backside of the connector plate and the method further comprises operably connecting the sod roller terminal attachment to the jointed arm with the at least one pin connector.

4. The method according to claim 1, wherein the shaft has a length of least 2', 2.5', 3', 3.5', 4', 4.5', 5', 5.5', 6', 6.5', and 7', or a length in a range between any two of the listed values.

5. The method according to claim 1, wherein the angle arm is fixedly attached to the front face of the connector plate such that an angle formed by the second side of the angle arm and the front face of the connector plate is between about 70° and about 120°.

6. The method according to claim 5, wherein the angle arm is fixedly attached to the front face of the connector plate such that an angle formed by the second side of the angle arm and the front face of the connector plate is about 90°.

7. The method according to claim 6, wherein the angle arm is fixedly attached at a point between a side edge of the connector plate and a center of the connector plate.

8. The method according to claim 1, wherein there is a shaft fixedly attached to the second side of the angle arm and the method further comprises,
   inserting the shaft attached to the second side of angle arm into a second sod roll;
   positioning the sod rolls, utilizing the jointed arm, on or against the surface on which the sod rolls are to be unrolled; and
   moving the jointed arm, with the sod rolls supported thereon, so as to unroll the sod rolls on the surface.

9. The method according to claim 1, wherein the terminal attachment further comprises a flange cap, for affixing to the shaft, and the method further comprises affixing the flange cap on at least one of a proximal end of the shaft and a distal end of the shaft.

10. The method according to claim 9, wherein the flange cap comprises a tubular body, a flange plate radiating from the tubular body, and a threaded hole in the tubular body for receiving a tightening screw to secure the flange cap to the shaft and the method further comprises engaging the tightening screw with the threaded hole to contact the shaft, so as to secure the flange cap on the shaft.

11. The method according to claim 10, wherein the shaft comprises a screw receiving space and the method further comprises engaging the tightening screw with the screw receiving space to secure the flange cap to the shaft.

12. The method according to claim 1, wherein the shaft is fixedly attached to the angle arm approximately parallel or collinear with the angle arm.

13. The method according to claim 9, wherein the shaft is fixedly attached approximately perpendicular to the one side of the angle arm and further comprising another shaft fixedly attached approximately perpendicular to the second side of the angle arm, and
   the method further comprises,
      inserting the shaft attached to the one side of the angle arm into the sod roll;
      attaching a flange cap to the shaft on the one side of the angle arm;
      inserting the shaft attached to the second side of angle arm into a second sod roll;
      attaching a flange cap to the shaft on the second side of the angle arm;
      positioning the first and second sod rolls, utilizing the jointed arm, on or near the surface on which the sod rolls are to be unrolled; and
      moving the jointed arm, with the sod rolls supported thereon, so as to unroll the sod rolls on the surface.

14. The method according to claim 13, wherein the surface is inclined.

15. The method according to claim 7, wherein the shaft is fixedly attached approximately perpendicular to the one side of the angle arm and another shaft is operably attached approximately perpendicular to the second side of the angle arm, and the method further comprises, inserting the shaft attached to the one side of the angle arm into the sod roll;
   inserting the shaft attached to the second side of angle arm into a second sod roll;
   positioning the first and second sod rolls, utilizing the jointed arm, on or near the surface on which the sod rolls are to be unrolled; and
   moving the jointed arm, with the sod rolls supported thereon, so as to unroll the sod rolls on the surface.

16. The method according to claim 15, wherein the surface is inclined, so as to be below a surface on which the excavator operates.

17. The method according to claim 7, wherein the terminal attachment further comprises at least one support fixedly connected between the connector plate and the second side of the angle arm.

18. The method according to claim 6, wherein the terminal attachment further comprises:
   a flange cap that comprises a tubular body, a flange plate radiating from the tubular body, and a bore hole in the flange plate,
   a tightening screw, and
   a screw receiving space in the angle arm,
   wherein the method further comprises placing the flange cap at a proximal end of the shaft and engaging the tightening screw through the bore hole and into the screw receiving space to secure the flange cap to the angle arm or the connector plate.

19. A method for unrolling a sod roll on a surface comprising:
   obtaining an excavator having a single, extendable, jointed arm with a sod roller terminal attachment operably connected thereto, the sod roller terminal attachment comprising,
   a connector plate having a front face and a back side, wherein the backside is configured to be operably connectable to the single, extendable, jointed arm of the excavator,
   a shaft comprising a proximal end that is fixedly attached to the front face of the connector plate, so as to be immovable;
   inserting the shaft into the sod roll, so as to support the sod roll with the jointed arm;
   positioning the jointed arm, with the terminal attachment connected thereto and with the sod roll supported thereon, to a side of the excavator and placing the sod roll on or near the surface on which the sod roll is to be unrolled; and
   moving the excavator, so as to unroll the sod roll supported on the jointed arm, in the same direction as the moving excavator.

20. The method according to claim 19, wherein the terminal attachment further comprises a flange cap, for affixing to the shaft, the flange cap comprising:
   a tubular body,
   a flange plate radiating from the tubular body, and
   a threaded hole in the tubular body for receiving a tightening screw to secure the at least one flange cap to the shaft,
   wherein the method further comprises,
   securing the flange cap to at least one of a proximal end and a distal end of the shaft.

21. The method according to claim 19, wherein the surface is inclined, so as to be below a surface on which the excavator moves.

22. A method for unrolling a sod roll on a surface, the method comprising:
- obtaining an excavator with a single, extendable, jointed arm having thereon a sod roller terminal attachment comprising,
- a connector plate comprising a front side and a back side, wherein the backside is configured to operably connect to the jointed arm;
- a shaft comprising a proximal end that is fixedly and immovably attached to the front side of the connector plate, so as to be at least approximately parallel to the connector plate and perpendicular to the excavator jointed arm;
- inserting the shaft into the sod roll, so as to support the sod roll on the shaft with the excavator jointed arm;
- positioning the sod roll, utilizing the excavator jointed arm, on or against the surface on which the sod roll is to be unrolled; and
- moving the excavator jointed arm with the sod roll supported on the shaft, so as to unroll the sod roll on the surface.

\* \* \* \* \*